(12) United States Patent
Futral et al.

(10) Patent No.: US 7,287,101 B2
(45) Date of Patent: Oct. 23, 2007

(54) DIRECT MEMORY ACCESS USING MEMORY DESCRIPTOR LIST

(75) Inventors: William T. Futral, Portland, OR (US); Jie Ni, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 10/635,306

(22) Filed: Aug. 5, 2003

(65) Prior Publication Data

US 2005/0033874 A1 Feb. 10, 2005

(51) Int. Cl.
*G06F 13/28* (2006.01)
(52) U.S. Cl. .................. 710/22; 710/24; 711/206; 711/208; 711/209
(58) Field of Classification Search ............ 710/22, 710/24
See application file for complete search history.

(56) References Cited

U.S. PATENT DOCUMENTS

| | | | | |
|---|---|---|---|---|
| 5,933,654 A * | 8/1999 | Galdun et al. ............ 710/23 |
| 2002/0007427 A1 * | 1/2002 | Forin ..................... 710/26 |
| 2002/0144027 A1 | 10/2002 | Schmisseur |
| 2003/0079033 A1 * | 4/2003 | Craft et al. .............. 709/230 |
| 2004/0168030 A1 * | 8/2004 | Traversat et al. ......... 711/133 |
| 2005/0060441 A1 | 3/2005 | Schmisseur |

OTHER PUBLICATIONS

OSR Open Systems Resources, Inc., "How NT Describes I/O Requests", 1998, 11 pages.
Microsoft Corporation, "What Is Really In That MDL?", Jan. 24, 2006, 3 pages, available at http://www.microsoft.com/whdc/driver/tips/mdl.mspx.
Microsoft Corporation, "DMA Support In Windows Drivers", May 10, 2006, 39 pages, available at http://www.microsoft.com/whdc/driver/kernel/dma.mspx.

* cited by examiner

*Primary Examiner*—Donald Sparks
*Assistant Examiner*—Niketa I. Patel
(74) *Attorney, Agent, or Firm*—Blakely, Sokoloff, Taylor & Zafman LLP (57) ABSTRACT

Machine-readable media, methods, and apparatus are described for transferring data. In some embodiments, an operating system may allocate pages to a buffer and may build a memory descriptor list that references the pages allocated to the buffer. A direct memory access (DMA) controller may process the memory descriptor list and transfer data between a buffer defined by the memory descriptor list and another location per the memory descriptor list. The DMA controller may further support data transfers that involve buffers defined by scatter gather lists and/or chained DMA descriptors built by a device driver.

23 Claims, 5 Drawing Sheets

DIRECT MEMORY ACCESS USING MEMORY DESCRIPTOR LIST

BACKGROUND

In a computing device, a processor may offload a data transfer to a direct memory access (DMA) engine or controller. In response to a data transfer request, the processor may execute a device driver. The device driver may cause the processor to generate one or more DMA descriptors defining the data transfer. The DMA controller may then process the DMA descriptors and transfer data per the DMA descriptors.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for transferring data with a direct memory access (DMA) engine or controller. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
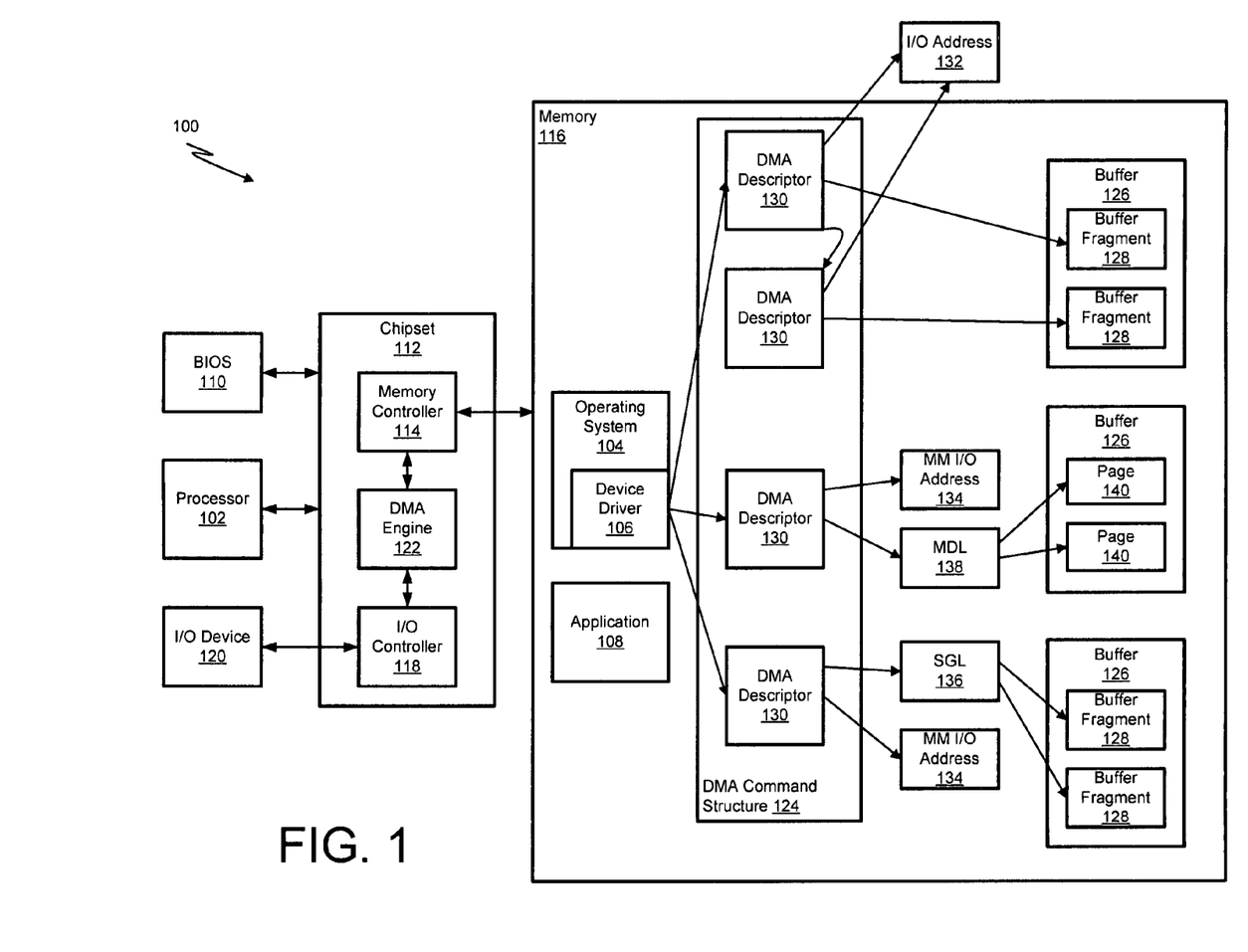
FIG. 1 illustrates an embodiment of a computing device having a direct memory access (DMA) controller.

Referring now to FIG. 1, an example embodiment of a computing device 100 is illustrated. The computing device 100 may comprise one or more processors 102. The processors 102 may perform actions in response to executing instructions of an operating system 104, device driver 106, application 108, basic input/output system (BIOS) routines 110, and/or some other software or firmware module.

The computing device 100 may further comprise a chipset 112 that is coupled to the processors 102 via a processor bus. The chipset 112 may comprise one or more integrated circuit packages or chips that couple the processors 102 to other components of the computing device 100. In particular, the chipset 112 may comprise a memory controller 114 coupled to a memory 116 via a memory bus. The memory 116 may comprise memory devices having addressable storage locations that may be read from and/or written to. The memory 116 may comprise one or more different types of memory devices such as, for example, dynamic random access memory (DRAM) devices, synchronous dynamic random access memory (SDRAM) devices, double data rate (DDR) SDRAM devices, and/or other volatile or non-volatile memory devices.

The chipset 112 may further comprise input/output (I/O) controllers 118 coupled to I/O devices 120 (e.g. a mouse, keyboard, video controller, network interface controller, hard disk, floppy disk, wireless receivers, wireless transmitters, etc.) via buses. For example, the chipset 112 may comprise peripheral component interconnect (PCI) controllers, accelerated graphics port (AGP) controllers, universal serial bus (USB) controllers, low pin count (LPC) bus controllers, and/or other input and/or output (I/O) controllers to control and/or transfer data via the respective buses.

The chipset 112 may also comprise a direct memory access (DMA) engine or controller 122. The DMA controller 122 may process a DMA command structure 124 and perform data transfers that involve buffers 126 and/or I/O devices 120 per the DMA command structure 124. In one embodiment, the buffers 126 may be virtually contiguous but physically non-contiguous. It should be appreciated that virtually contiguous buffers 126 may permit software and firmware modules such as, for example, application 108 to easily manipulate the buffer 126 via a range of sequential virtual addresses. Further, not requiring the buffer 126 to be physically contiguous may enable the operating system 104 to more effectively manage the memory 116. However, the DMA controller 122 may be limited to accessing memory 116 via physical addresses. Accordingly, the DMA command structure 124 directs the DMA controller 122 to the potentially physically non-contiguous buffer fragments 128 that comprise the buffers 126.

As shown in FIG. 1, the DMA command structure 124 may comprise chained DMA descriptors 130 that define a source and destination of a data transfer. In one embodiment, the DMA descriptors 130 may specify an I/O device 120 as a source or destination via a reference to an I/O addresses 132 or memory-mapped I/O addresses 134 for the I/O device 120. Moreover, the DMA descriptors 130 may specify source and destination buffers 126 via references to buffer fragments 128, via references to scatter gather lists 136 that reference buffer fragments 128, and/or via references to memory descriptor lists 138 that reference pages 140.

Figure 2:
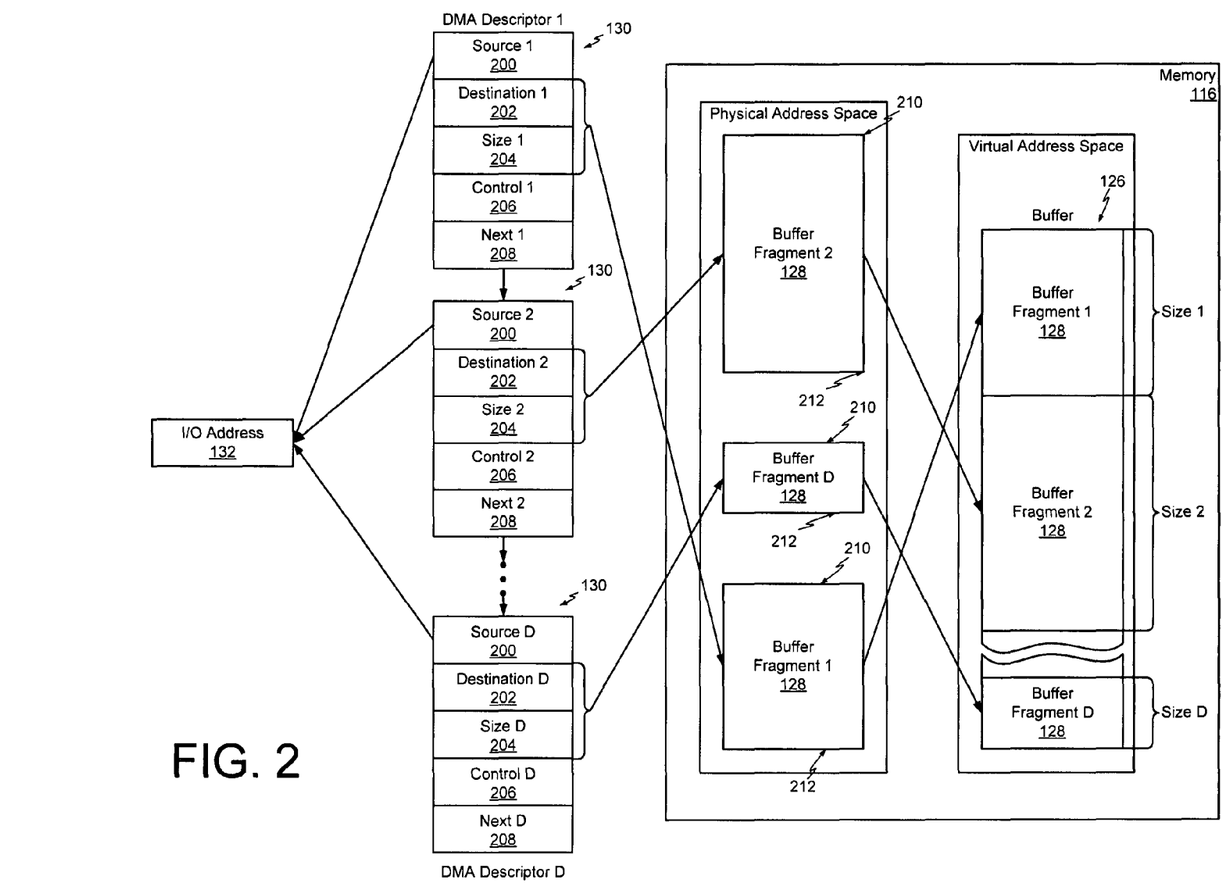
FIG. 2 illustrates chained DMA descriptors that define a virtually contiguous buffer for the DMA controller of FIG. 1.

As shown in FIG. 2, a DMA descriptor 130 may comprise a source 200, a destination 202, a size 204, control settings 206, and a next DMA descriptor reference 208. In general, the source 200 may reference a source location from which to transfer the data and the destination 202 may reference a destination location to which to transfer the data. Further, the size 204 may indicate how much data is to be transferred. For example, the size 204 may indicate the number of bytes, the number of lines, the number of buffer fragments, the number of pages, etc. to be transferred.

As depicted in FIGS. 1-4, the source 200 and the destination 202 of the DMA descriptor 130 may reference an I/O device 120, a buffer fragment 128, a scatter gather list 136, a memory descriptor list 138, and/or some other structure that defines a source buffer, a destination buffer, a source I/O device 120, and/or a destination I/O device 120. The source 200 and destination 202 of a DMA descriptor 130 may reference an I/O device 120 via an I/O address 132 of an I/O address space. The source 200 and destination 202 may also reference an I/O device 120 via a memory-mapped I/O address 134 of the memory 116.

The next reference 208 of a DMA descriptor 130 may comprise a reference to another DMA descriptor 130. The next reference 208 may permit chaining of multiple DMA descriptors 130 to describe data transfers involving multiple I/O devices 120, buffer fragments 128, scatter gather lists 136, and/or memory descriptor lists 138.

The control settings 206 may indicate the format of the source 200, destination 202, the size 204, and/or the next reference 208. The control settings 206 may also provide other settings that further control the data transfer. In one embodiment, the control settings 206 may indicate whether the source 200 comprises (i) an address that references a buffer fragment 128, (ii) an I/O address 132 that references an I/O device 120, (iii) a memory-mapped I/O address 134 that references an I/O device 120, (iv) an address that references a scatter gather list 136, or (v) an address that references a DMA descriptor 130. Similarly, in one embodiment, the control settings 206 may indicate whether the destination 202 comprises (i) an address that references a buffer fragment 128, (ii) an I/O address 132 that references an I/O device 120, (iii) a memory-mapped I/O address 134 that references an I/O device 120, (iv) an address that references a scatter gather list 136, or (v) an address that references a DMA descriptor 130. The control settings 206 may also indicate whether the size 204 specifies the number of bytes, the number of lines, the number of buffer fragments, or the number of pages, etc. to be transferred. The control settings 206 may further indicate whether the next reference 208 references another DMA descriptor 130 or the current DMA descriptor 130 is the last DMA descriptor 130 of the transfer.

In one embodiment, if the source 200 of the DMA descriptor 130 comprises a reference to a buffer fragment 128, the DMA controller 122 may read data from the buffer fragment 128 per the source 200 and size 204. As illustrated in FIG. 2, the source 200 may comprise a physical address for the start location 210 of the referenced buffer fragment 128 and the size 204 may define a physical address for an end location 212 of the referenced buffer fragment 128. The DMA controller 122 may read based upon the source 200 and size 204 from the physical address for the start location 210 to the physical address for the end location 212 of the referenced buffer fragment 128.

Similarly, in one embodiment, if the destination 202 of the DMA descriptor 130 comprises a reference to a buffer fragment 128, the DMA controller 122 may write data to the buffer fragment 128 per the destination 202 and size 204. In one embodiment, the destination 202 may comprise a physical address for the start location 210 of the referenced buffer fragment 128 and the size 204 may define a physical address for an end location 212 of the referenced buffer fragment 128. The DMA controller 122 may write based upon the destination 202 and size 204 from the physical address of the start location 210 to the physical address of the end location 212 of the referenced buffer fragment 128.

In one embodiment, if the source 200 of the DMA descriptor 130 comprises a reference to an I/O address 132 or a memory-mapped I/O address 134, the DMA controller 122 may read a transfer size 204 of data from the I/O address 132 or memory-mapped I/O address 134. Similarly, if the destination 202 of the DMA descriptor 130 comprises a reference to an I/O address 132 or a memory-mapped I/O address 134, the DMA controller 122 in one embodiment may write a transfer size 204 of data to the I/O address 132 or memory-mapped I/O address 134.

Figure 3:
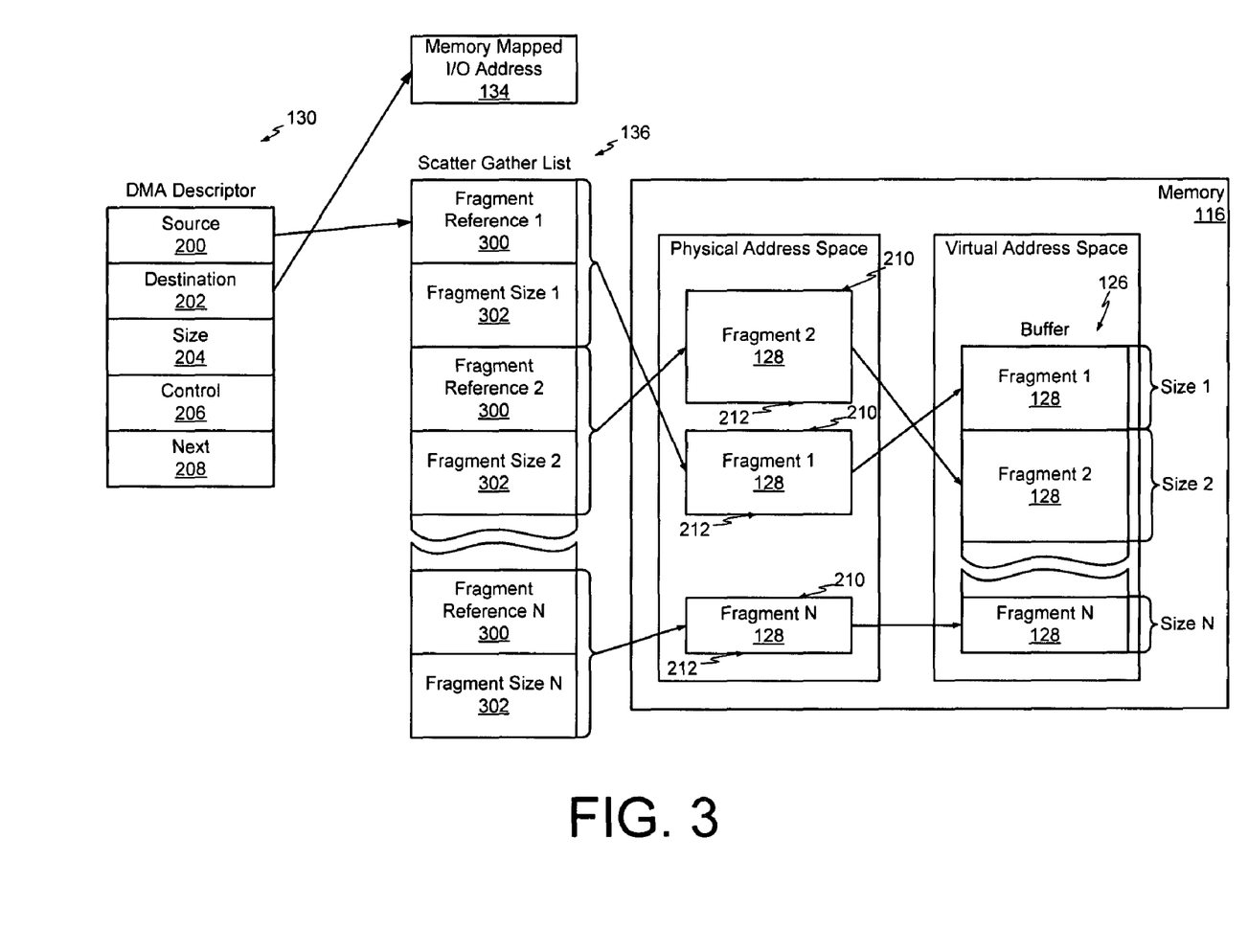
FIG. 3 illustrates a scatter gather list that defines a virtually contiguous buffer for the DMA controller of FIG. 1.

Referring now to FIG. 3, if the source 200 of the DMA descriptor 130 comprises a reference to a scatter gather list 136, then the DMA controller 122 may read the scatter gather list 136 from memory 116 per the source 200 and may read data from buffer fragments 128 per the scatter gather list 136.

Similarly, if the destination 202 of the DMA descriptor 130 comprises a reference to a scatter gather list 136, then the DMA controller 122 may read the scatter gather list 136 from memory 116 per the destination 202 and may write data to buffer fragments 128 per the read scatter gather list 136.

As shown in FIG. 3, the scatter gather list 136 may comprise fragment references 300 and corresponding fragment sizes 302. In one embodiment, each fragment reference 300 may specify a start location 210 of the referenced buffer fragment 128 and each fragment size 300 may specify an end location 212 of the referenced data fragment 128 in the form of a byte count, word count, or some other unit count from the start location 210. In response to a source scatter gather list 136, the DMA controller 122 may read data from the a source buffer 126 defined by the referenced buffer fragments 128. Similarly, in response to a destination scatter gather list 136, the DMA controller 122 may write data to a destination buffer 126 defined by the referenced buffer fragments 128. In particular, the DMA controller 122 may read or write data from the start location 210 of the defined buffer 126 to the end location 212 of the first referenced buffer fragment 128 (e.g. Fragment 1). Further, the DMA controller 122 may read or write data from the start location 210 to the end location 212 of each intermediate buffer fragment 128 (e.g. Fragment 2 through Fragment N-1). Moreover, the DMA controller 122 may read or write data from the start location 210 of the last referenced buffer fragment 128 (e.g. Fragment N) to the end location 212 of the buffer 126.

Figure 4:
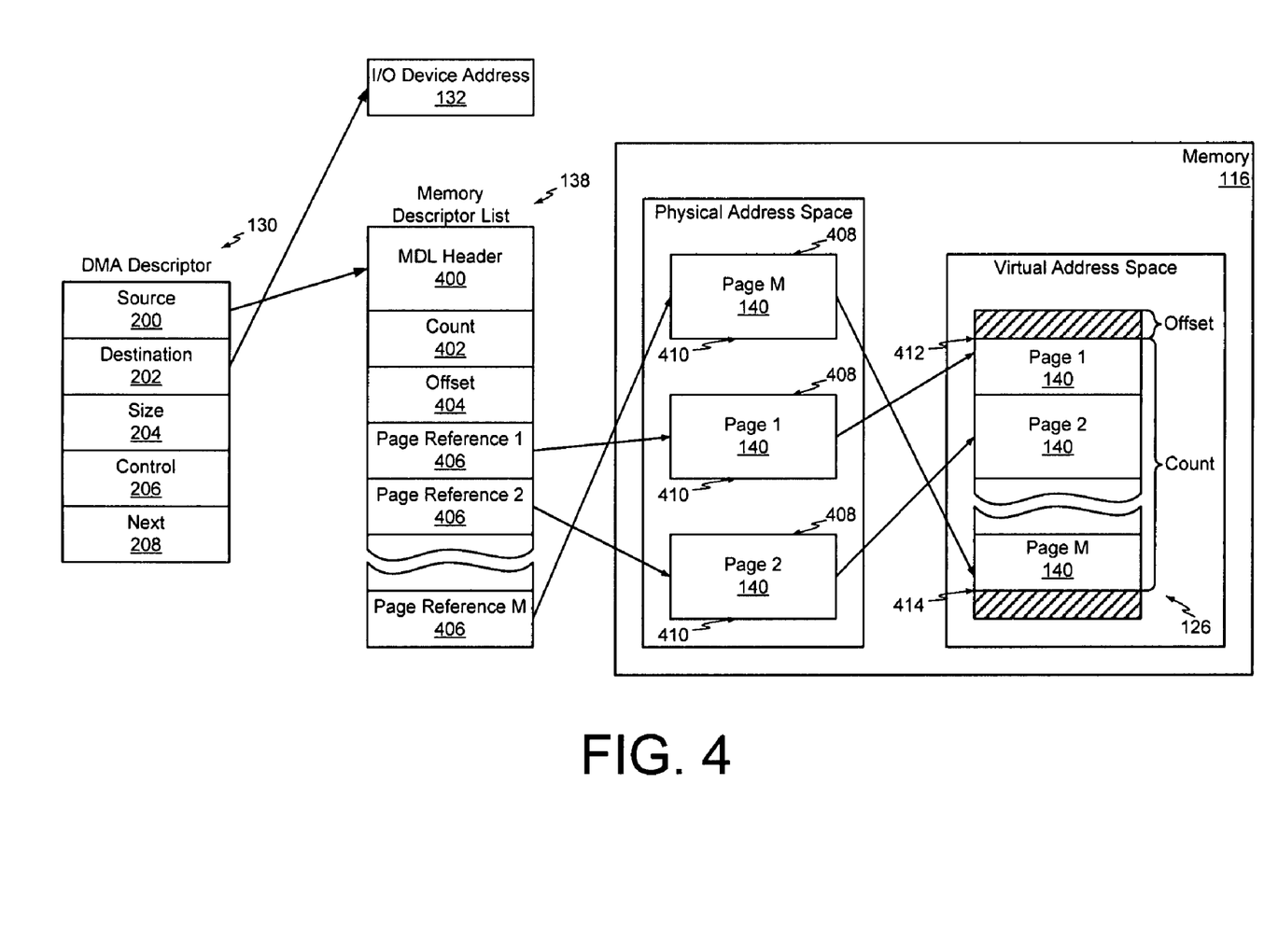
FIG. 4 illustrates a memory descriptor list that defines a virtually contiguous buffer for the DMA controller of FIG. 1.

Referring now to FIG. 4, if the source 200 of the DMA descriptor 130 comprises a reference to a memory descriptor list 138, then the DMA controller 122 may read the memory descriptor list 138 from memory 116 per the source 200 and may read data from pages 140 per the read memory descriptor list 138. Similarly, if the destination 202 of the DMA descriptor 130 comprises a reference to a memory descriptor list 138, then the DMA controller 122 may read the memory descriptor list 138 from memory 116 per the destination 202 and may write data to pages 140 per the read memory descriptor list 138.

The memory descriptor list 138 may comprise a header 400, a count 402, an offset 404, and one or more page references 406. In one embodiment, each page reference 406 may specify a start location 408 of a referenced page 140. The end location 410 of each page may be specified by a page size of an operating system. Common page sizes used by operating systems are 4 kilobytes and 4 megabytes; however, other page sizes may be used. The offset 404 may specify a start location 412 of a buffer 126 defined by the memory descriptor list 138 and the count 402 may specify an end location 414 of the buffer 126. In one embodiment, the offset 404 may specify the start location 412 of the buffer 126 as the number of bytes from the start location 408 of the referenced first page 406. In another embodiment, the offset 404 may specify the start location 412 of the buffer 126 by supplying the number of words, double words, lines, etc. from the start of the referenced first page 140. The count 402 may specify the end location 414 of the buffer 126 by specifying the size of the defined buffer 126. In one embodiment, the count 402 may specify the buffer size by providing a byte count. In another embodiment, the count 402 may specify the end location 414 by providing a word count, double word count, line count, etc.

In response to a source memory descriptor list 138, the DMA controller 122 may read data from a source buffer 126 defined by the referenced pages 140. Similarly, in response to a destination memory descriptor list 138, the DMA controller 122 may write data to a destination buffer 126 defined by the referenced pages 140. In particular, the DMA controller 122 may read or write data from the start location 412 of the defined buffer 126 in the first page 140 (e.g. Page 1) to the end location 410 of the first page 140. Further, the DMA controller 122 may read or write data from the start location 408 to the end location 410 of each intermediate page 140 (e.g. Page 2 through Page M-1). Moreover, the DMA controller 122 may read or write data from the start location 408 of the last referenced page 140 (e.g. Page M) to the end location 414 of the buffer 126. The start location 412 of the buffer 126 and the start location 408 of the first page 140 may coincide. However, as illustrated in FIG. 4., the start location 412 of the buffer 126 may reside within the first page 140 thus resulting in the buffer 126 spanning only a portion of the first page 140. Similarly, the end location 414 of the buffer 126 and the end location 410 of the last page 140 may coincide; however, as illustrated in FIG. 4., the end location 414 of the buffer 126 may reside within the last page 140 thus resulting in the buffer 126 spanning only a portion of the last page 140.

Figure 5:
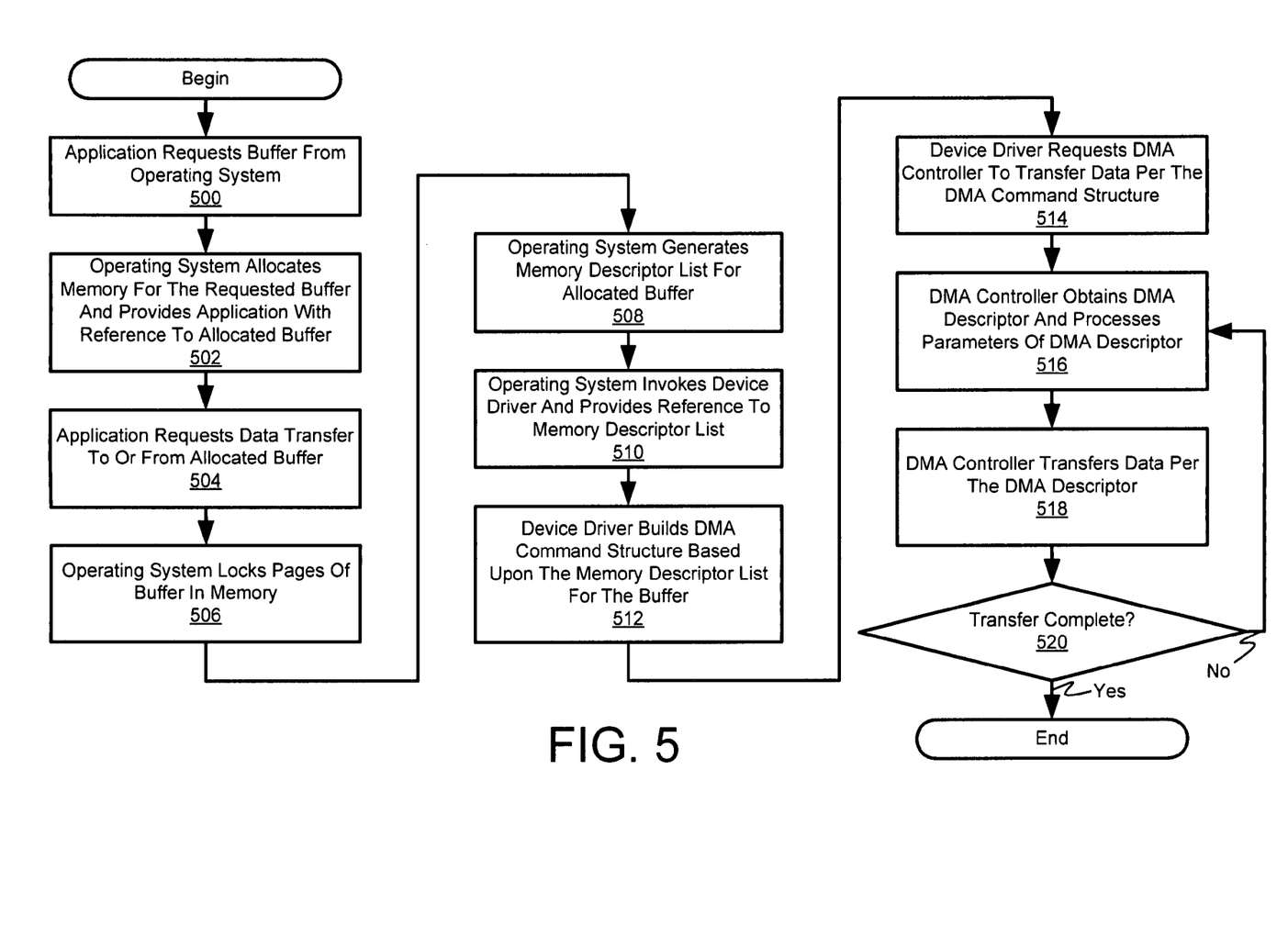
FIG. 5 illustrates a DMA transfer method of the DMA controller of FIG. 1.

Referring now to FIG. 5, there is shown a DMA method of transferring data between an I/O device 120 and a buffer 126. However, one of ordinary skill in the art may easily modify the method of FIG. 5 to transfer data from a source buffer 126 to a destination buffer 126, or from one I/O device 120 to another I/O device 120. As depicted, the method may begin in block 500 with an application 108 requesting the operating system 104 to allocate a buffer 126 having a requested size. In response to the request, the operating system 104 may allocate to the buffer 126 one or more virtually contiguous pages 140 of the memory 116 to obtain an allocated storage area having the requested size (block 502). The operating system 104 may further provide the application 108 with the virtual address of the first storage location of the allocated storage area for the buffer 126.

In block 504, the application 108 may request the operating system 104 to read a transfer size 204 of data from the allocated buffer 126 or write a transfer size 204 of data to the allocated buffer 126. In response to receiving the request, the operating system 104 in block 506 may lock the pages 140 of the allocated buffer 126 in memory 116 to prevent swapping of the pages 140 to a mass storage device (e.g. a disk not shown) or movement of the pages 140 to other physical locations of memory 116. After successfully locking the pages 140 in memory 116, the operating system 104 may generate one or more memory descriptor lists 138 comprising page references 406 that physically address the pages 140 of the allocated buffer 126 (block 508). The operating system 104 may then in block 510 invoke execution of the device driver 106 for the I/O device 120 and may provide the invoked device driver 106 with a reference to the generated memory descriptor lists 138 for the allocated buffer 126.

The device driver 106 in block 512 may build from the referenced memory descriptor lists 138 a DMA command structure 124 that defines the data transfer for the DMA controller 122. In one embodiment, the device driver 106 may build chained DMA descriptors 130 (e.g. FIG. 2) and/or scatter gather lists 136 (e.g. FIG. 3) that define the buffer 126 for the DMA controller 122. In another embodiment, the device driver 106 may simply build a DMA descriptor 130 for each memory descriptor list 138 that comprises a source 200 or destination 202 that physically addresses its respective memory descriptor list 138 (e.g. FIG. 4). In block 514, the device driver 106 may provide the DMA controller 122 with a physical address that references the built DMA command structure 124 and may request the DMA controller 122 to begin transferring data per the referenced DMA command structure 124.

In block 516, the DMA controller 122 may obtain a DMA descriptor 130 of the referenced DMA command structure 124 and may determine the format of the source 200, destination 202, size 204, and next 208 parameters of the DMA descriptor 130 from the control settings 206 of the DMA descriptor 130. The DMA controller 122 then in block 518 may transfer data per the DMA descriptor 130. In particular, depending upon the format of the source 200 and destination 202, the DMA controller 122 may retrieve scatter gather lists 136 and/or memory descriptor lists 138 referenced by the source 200 and/or the destination 202 of the DMA descriptor 130, and may transfer data to and/or from buffers 126 defined by the retrieved lists 136, 138.

In block 520, the DMA controller 122 may determine whether the transfer defined by the DMA command structure 124 is complete and may return to block 516 to obtain another DMA descriptor 130 if the transfer is not complete. In one embodiment, the DMA controller 122 may determine that the transfer is complete based upon the control settings 206 indicating that the next 208 parameter of the current DMA descriptor 130 does not reference another DMA descriptor 130. In response to determining that the transfer is complete, the DMA controller 122 may provide the device driver 106 with a transfer complete indicator to signal completion of the request transfer.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
   processing a direct memory access (DMA) descriptor that comprises a reference to a memory descriptor list of an operating system,
   processing the memory descriptor list in response to processing the DMA descriptor, and
   transferring data per the memory descriptor list in response to processing the memory descriptor list
   processing another DMA descriptor that comprises a reference to a scatter gather list generated by a device driver;
   processing the scatter gather list in response to processing the another DMA descriptor, and transferring data per the scatter gather list in response to processing the scatter gather list.

2. The method of claim 1 comprising
   processing another DMA descriptor that comprises a reference to a buffer fragment, and
   transferring data between the buffer fragment and an I/O device in response to processing the another DMA descriptor.

3. The method of claim 1 wherein transferring data comprises transferring data to a buffer defined by the memory descriptor list.

4. The method of claim 1 wherein transferring data comprises transferring data from a buffer defined by the memory descriptor list.

5. The method of claim 4 wherein
   the buffer comprises a plurality of pages, and
   transferring data from the buffer is based upon a size of the pages.

6. The method of claim 5 further comprising determining the size of the pages from control settings of the DMA descriptor.

7. The method of claim 1 further comprising determining a source and a destination based upon control settings of the DMA descriptor.

8. The method of claim 1 further comprising
   allocating pages of a memory to a buffer, and
   populating page references of the memory descriptor list with physical addresses for the pages allocated to the buffer.

9. The method of claim 8 further comprising locking the pages allocated to the buffer in the memory prior to populating the page references of the memory descriptor list.

10. The method of claim 9 further comprising
    populating the memory descriptor list with an offset that defines a start of the buffer in a first page allocated to the buffer, and
    populating the memory descriptor list with a count that defines an end location of the buffer in a last page allocated to the buffer.

11. A tangible machine-readable medium comprising a plurality of instructions that in response to being executed result in a computing device
    generating with an operating system a memory descriptor list for a buffer,
    generating with a device driver a direct memory access (DMA) descriptor that references the memory descriptor list of the operating system and an I/O device, and
    requesting a DMA controller to transfer data between the buffer and the I/O device per the DMA descriptor and the memory descriptor list.
    processing another DMA descriptor that comprises a reference to a scatter gather list generated by a device driver;
    processing the scatter gather list in response to processing the another DMA descriptor, and transferring data per the scatter gather list in response to processing the scatter gather list.

12. The machine-readable medium of claim 11 wherein the plurality of instructions further result in the computing device locking the buffer in memory.

13. The machine-readable medium of claim 11 wherein the plurality of instructions further result in the computing device
    allocating pages of a memory to the buffer,
    locking the pages allocated to the buffer in the memory, and
    populating page references of the memory descriptor list with physical addresses for the pages allocated to the buffer.

14. The machine-readable medium of claim 13 wherein the plurality of instructions further result in the computing device populating the memory descriptor list with
    an offset that defines a start of the buffer in a first page of the allocated pages,
    and a count that defines an end location of the buffer in a last page of the allocated pages.

15. The machine-readable medium of claim 11 wherein the plurality of instructions further result in the computing device providing the DMA descriptor with
    a source that references the memory descriptor list,
    a destination that references the I/O device, and
    control settings that indicate the source references the memory descriptor list and the destination references the I/O device.

16. An apparatus comprising
    a memory controller to access memory,
    an I/O controller to access an I/O device, and
    a direct memory access (DMA) controller to access memory via the memory controller, to access the I/O device via the I/O controller, and to transfer data per a DMA command structure of the memory,
    wherein the DMA controller transfers data between the I/O device and a buffer comprising pages of the memory in response to determining that the DMA command structure comprises a reference to the I/O device and a reference to a memory descriptor list generated by an operating system to contain references to the pages of the buffer.
    processing another DMA descriptor that comprises a reference to a scatter gather list generated by a device driver;
    processing the scatter gather list in response to processing the another DMA descriptor, and transferring data per the scatter gather list in response to processing the scatter gather list.

17. The apparatus of claim 16 wherein the DMA controller transfers data from the buffer to the I/O device in response to determining that a source of the DMA command structure comprises the reference to the memory descriptor list and a destination of the DMA command structure comprises the reference to the I/O device.

18. The apparatus of claim 16 wherein the DMA controller transfers data from the I/O device to the buffer in response to determining that a source of the DMA command structure comprises the reference to the I/O device and a destination of the DMA command structure comprises the reference to the memory descriptor list.

19. The apparatus of claim 16 wherein the DMA controller transfers between the I/O device and a buffer comprising fragments of the memory in response to determining that the DMA command structure comprises a reference to the I/O device and a reference to a scatter gather list that comprises references to the fragments and corresponding sizes for the fragments.

20. The apparatus of claim 16 wherein the DMA controller transfers between the I/O device and a buffer comprising fragments of the memory in response to determining that the DMA command structure comprises a chain of DMA descriptors that each comprise a reference to the I/O device and a reference to a respective fragment of the buffer.

21. A system comprising a processor, memory comprising pages to store direct memory access (DMA) structures, buffers, device drivers, and an operating system, a memory controller to access the DMA command structures, buffers, device drivers, and the operating system, and a DMA controller to transfer data per DMA command structures of the memory, wherein the processor, in response to executing the operating system, allocates pages of the memory to a buffer and builds a memory descriptor list in the memory that comprises references to the pages allocated to the buffer, and wherein the processor, in response to executing the device driver, builds a DMA command structure that comprises a DMA descriptor with a reference to the memory descriptor list and requests the DMA controller to transfer data per the DMA descriptor and the memory descriptor list that is referenced by the DMA command structure processing another DMA descriptor that comprises a reference to a scatter gather list generated by a device driver;

processing the scatter gather list in response to processing the another DMA descriptor, and transferring data per the scatter gather list in response to processing the scatter gather list.

22. The system of claim 21 wherein the processor, in response to executing the device driver, populates a source of the DMA descriptor with the reference to the memory descriptor list, and the DMA controller, in response to processing the memory descriptor list, reads data from the pages of the buffer.

23. The system of claim 21 wherein the processor, in response to executing the device driver, populates a destination of the DMA descriptor with the reference to the memory descriptor list, and the DMA controller, in response to processing the memory descriptor list, writes data to the pages of the buffer.

* * * * *

UNITED STATES PATENT AND TRADEMARK OFFICE
CERTIFICATE OF CORRECTION

| | | |
|---|---|---|
| PATENT NO. | : 7,287,101 B2 | Page 1 of 1 |
| APPLICATION NO. | : 10/635306 | |
| DATED | : October 23, 2007 | |
| INVENTOR(S) | : Futral et al. | |

It is certified that error appears in the above-identified patent and that said Letters Patent is hereby corrected as shown below:

Column 8, at line 11, delete ".".
Column 8, at line 60, delete ".".

Signed and Sealed this

Thirteenth Day of May, 2008

JON W. DUDAS
*Director of the United States Patent and Trademark Office*